United States Patent [19]

Plepys et al.

[11] 3,896,140
[45] July 22, 1975

[54] IODONIUM COMPOUNDS OF 3,5-DIMETHYLISOXAZOLE

[75] Inventors: Raymond A. Plepys; Zdravko Jezic, both of Midland, Mich.

[73] Assignee: The Dow Chemical Company, Midland, Mich.

[22] Filed: Jan. 2, 1973

[21] Appl. No.: 320,508

[52] U.S. Cl.............................. 260/307 H; 424/272
[51] Int. Cl.............................................. C07d 85/22
[58] Field of Search.................................. 260/307 H

[56] References Cited
UNITED STATES PATENTS

| | | | |
|---|---|---|---|
| 3,422,152 | 1/1969 | Doub.................................. | 260/612 |
| 3,622,586 | 11/1971 | Jezic.................................. | 260/295 S |

*Primary Examiner*—Donald G. Daus
*Assistant Examiner*—Raymond V. Rush
*Attorney, Agent, or Firm*—Theodore Post; C. Kenneth Bjork

[57] ABSTRACT

Concerns 3,5-dimethyl-4-isoxazolyliodonium salts of the formula

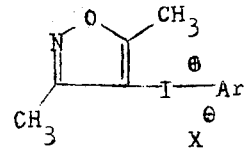

in which Ar is thienyl, phenoxyphenyl, phenyl or substituted phenyl and X is a trifluoroacetate, trichloroacetate, chloride or bromide anion. The compounds are prepared by (a) oxidation of 4-iodo-3,5-dimethylisoxazole to 3,5-dimethyl-4-[bis(trifluoroacetoxy)iodo]isoxazole, and condensation of the latter with the corresponding activated aromatic compound, ArH or (b) acid-catalyzed condensation of a diacetoxyiodobenzene with 3,5-dimethylisoxazole when the benzene nucleus has halo substitution, i.e., for electrophilic substitution on the isoxazole ring. The compounds have antimicrobial activity.

5 Claims, No Drawings

IODONIUM COMPOUNDS OF 3,5-DIMETHYLISOXAZOLE

SUMMARY OF THE INVENTION

This invention concerns 3,5-dimethyl-4-isoxazolyliodonium salts represented by the formula

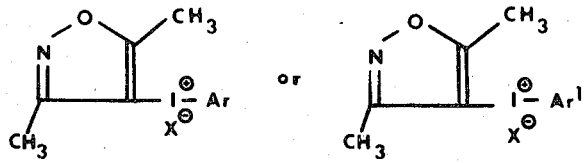

wherein Ar represents thienyl, phenyl or substituted phenyl, i.e., phenyl having substitution selected from phenoxy, 1 to 4 carbon alkoxy groups, and wherein Ar' is halophenyl, halo representing chloro or bromo; and X represents an anion of the group trifluoroacetate, trichloroacetate, bromide and chloride. The compounds are generally white solids, sparingly soluble in water and having decomposition points rather than melting points. The haloacetate salts are generally soluble in polar organic solvents such as, for example, the lower alcohols and acetone while the halide salts are only sparingly soluble therein.

The compounds wherein Ar represents thienyl, phenyl, lower alkylphenyl, lower alkoxyphenyl or phenoxyphenyl are prepared by mixing substantially one molar proportion of 3,5-dimethyl-4-[(bis-trifluoroacetoxy)iodo]isoxazole with substantially 2 molar proportions of thiophene, benzene, lower alkylbenzene, lower alkoxybenzene or phenoxybenzene in a liquid chlorinated hydrocarbon solvent such as, for example, methylene chloride, ethylene chloride, carbon tetrachloride, chloroform, methyl chloroform and the like chlorinated hydrocarbon solvents and mixtures thereof, with substantially 4 molar proportions of trifluoroacetic acid, gradually adding the last named to the mixture of primary reactants. The mixture is advantageously heated at reflux for about 15 minutes to about 1 hour and the product is recovered from the reaction medium by evaporating off the solvent and excess trifluoroacetic acid under vacuum. The resulting oily product is diluted with ether, precipitating a usually gray solid which, after washing with ether and recrystallizing from a minimum amount of acetone diluted with ether, gives the purified product as the trifluoroacetate salt. The product is identified by elemental analysis and by infrared and nuclear magnetic resonance spectra. The trichloroacetate is similarly prepared by substituting trichloroacetic acid in place of trifluoroacetic acid. The bromide salt is prepared by treating an acetone solution of either the trifluoroacetate salt or the trichloroacetate salt dissolved in acetone with aqueous 48% hydrogen bromide. The bromide salt crystallizes out, is filtered, washed with a small amount of acetone and dried to give a usually white solid. The chloride salt is similarly prepared, substituting aqueous hydrogen chloride for the aqueous hydrogen bromide.

The salts wherein Ar' is halophenyl, i.e., where electrophilic substitution on the isoxazole ring is desired, are made by adding substantially 2 to 3 molar proportions of concentrated sulfuric acid, with stirring, to a slurry of substantially one molar proportion of halosubstituted diacetoxyiodobenzene and substantially 1.2 to 1.5 molar proportions of 3,5-dimethylisoxazole in glacial acetic acid. The exothermic reaction raises the reaction mixture temperature to about 55°C. The reaction mixture is then stirred at about 35°C. for about 2 hours, poured into cold water, the insoluble heavy layer is extracted with methylene chloride and the remaining aqueous layer containing the iodonium acid sulfate is treated with a small amount of aqueous 48% hydrobromic acid to give the hydrobromide salt as a solid product.

DESCRIPTION OF SOME PREFERRED EMBODIMENTS

The following examples describe completely enabling and best mode procedures contemplated by the inventors for carrying out their invention. Temperature is given in centigrade degrees. The compounds are identified by elemental analysis and by infrared and nuclear magnetic resonance spectra.

EXAMPLE 1

(3,5-Dimethyl-4-isoxazolyl)-2-thienyliodonium trifluoroacetate

To a stirred solution of 15 g. (33 mmoles) of 3,5-dimethyl-4-[bis(trifluoroacetoxy)iodo]isoxazole and 5.1 g. (60 mmoles) thiophene in 100 ml. chloroform is added 10 ml. (15.3 g., 0.134 mole) of trifluoroacetic acid. The last ml. of acid turns the solution a muddy blue. The mixture is heated at reflux for 30 minutes, then is evaporated under vacuum to a red oil. The oil is diluted with 500 ml. of ether, precipitating a gray solid product which, after washing with ether, weighs 14.5 g. (100% yield), m.p. 134°–138°C. (dec.). The trifluoroacetate product is recrystallized by dissolving in a minimum amount of acetone and diluting (ca. 10-fold) with ether to give a product melting at 152°–153°C. (dec.).

Anal. Calcd. for $C_{11}H_9F_3INO_3S$: C, 31.6; H, 2.15; N, 3.34; I, 30.3. Found: C, 31.7; H, 2.18; N, 3.3; I, 30.6.

The corresponding trichloroacetate salt is prepared by carrying out the above condensation with six molar equivalents of trichloroacetic acid in chloroform solution in place of trifluoroacetic acid. The same work-up gives an 83% yield of a white solid, m.p. 114°–115°C. (dec.).

The corresponding bromide salt is prepared by treating an acetone solution of either the trifluoroacetate or trichloroacetate salt with HBr. To a solution of 5 g. (12 mmoles) of the trifluoroacetate salt in 100 ml. acetone, there is added all at once 3 ml. (ca. 20 mmole) of 48% HBr. Crystallization starts within one minute and is complete within 10 minutes. The product is filtered, washed with ca. 50 ml. acetone and dried, yielding 4 g. (87%) of white solid, m.p. 154°–155°C.

Anal. Calcd. for $C_9H_9BrIONS$: C, 27.9; H, 2.3; N, 3.6; Br, 20.7; I, 32.9. Found: C, 29.4, H, 2.6; N, 3.9; Br, 19.7; I, 32.4.

The corresponding chloride salt is prepared as above, using concentrated HCl. This yields 93% of a white solid, m.p. 201°–203°C. (dec.).

Anal. Calcd. for $C_9H_9ClINOS$: C, 31.6; H, 2.63; N, 4.1; I, 37.2. Found: C, 31.8; H, 2.68; N, 4.4; I, 37.3.

EXAMPLE 2

(3,5-Dimethyl-4-isoxazolyl) (p-methoxyphenyl)iodonium trifluoroacetate

Anisole is condensed with 3,5-dimethyl-4-[bis(trifluoroacetoxy)iodo]isoxazole using trifluoroacetic acid under the same conditions as in Example 1. In this case, addition of trifluoroacetic acid gives a brown coloration. The crude product is isolated in quantitative yield, m.p. 157°–158°C.

Anal. Calcd. for $C_{14}H_{13}F_3INO_4$: C, 38.0; H, 2.93; N, 3.16. Found: C, 38.1; H, 2.93; N, 3.0.

The corresponding bromide salt is prepared with HBr in acetone as above to give a 91% yield of product, m.p. 185°–194°C. (dec.).

Anal. Calcd. for $C_{12}H_{13}BrINO_2$: C, 35.2; H, 3.17; N, 3.4. Found: C, 35.3; H, 3.25; N, 3.3.

The corresponding chloride salt is prepared in the usual manner with HCl to give a 93% yield of product, m.p. 210°–230°C.

Anal. Calcd. for $C_{12}H_{13}ClINO_2$: C, 39.4; H, 3.56; N, 3.83. Found: C, 39.7; H, 3.64; N, 3.8.

The corresponding trichloroacetate salt is prepared by condensation with trichloroacetic acid to give a 45% yield of product, m.p. 115°–115.5°C. (dec.). The identity is confirmed by conversion to the bromide salt with HBr. Two to 4 carbon atom p-alkoxybenzenes are substituted for anisole to give the corresponding homologs.

EXAMPLE 3

(3,5-Dimethyl-4-isoxazolyl) (p-phenoxyphenyl)iodonium trifluoroacetate

The 3,5-dimethyl-4-[bis(trifluoroacetoxy)iodo]isoxazole is condensed with diphenyl ether using trifluoroacetic acid in chloroform, as described above. An 88% yield of the trifluoroacetate product, m.p. 171°–172°C. (dec.) is obtained.

Anal. Calcd. for $C_{19}H_{15}F_3INO_4$: C, 45.2; H, 3.0; N, 2.78. Found: C, 45.1; H, 3,17; N, 2.8.

The corresponding bromide and chloride salts are prepared by treatment with HBr and HCl in acetone. These salts melt at 161°–165°C. (dec.) and 198°–199°C. (dec.), respectively. They are obtained in yields of 64 and 75%, respectively.

The corresponding trichloroacetate salt is obtained in 57% yield, m.p. 116°C. (dec.). A small quantity is converted to the bromide via HBr/acetone. Its infrared spectra is identical to that of the bromide prepared from the trifluoroacetate.

EXAMPLE 4

(3,5-Dimethyl-4-isoxazolyl)phenyl iodonium bromide

To a slurry of 5 g. (52 mmole) of 3,5-dimethylisoxazole, 12 g. (37 mmole) diacetoxyiodobenzene, and 5 ml. glacial acetic acid, there is added with stirring 5 ml. (9.2 mmole) of concentrated sulfuric acid. During the addition, the solution turns red and the temperature rises to 55°C. The mixture is then stirred at ca. 35°C. for 2 hours and poured into 100 ml. cold water. The insoluble heavy layer is extracted with methylene chloride and the remaining aqueous layer is treated with 2 ml. of 48% HBr. A white oil immediately precipitates and solidifies, yielding 2 g. (14%) of product, m.p. 168°–170°C.

Anal. Calcd. for $C_{11}H_{11}BrINO$: C, 34.8; H, 2.9; N, 3.7. Found: C, 34.7; H, 2.87; N, 3.6.

The compound of Example 4 is most readily prepared by the procedure of Example 1, substituting benzene in place of thiophene. Pursuant to the procedure of Example 1, the corresponding 1 to 4 carbon atom lower alkylphenyl analogs are similarly prepared. The corresponding halophenyl analogs are prepared by the method of Example 4, i.e., for electrophilic substitution on the isoxazole ring.

The following Table gives the decomposition points of representative compounds of this invention.

TABLE I (3,5-DIMETHYL-4-ISOXAZOLYL)IODONIUM SALTS DECOMPOSITION POINTS

| | | $CF_3CO_2^{\ominus}$ a | $Br^{\ominus}$ b | $Cl^{\ominus}$ c | $CCl_3CO_2^{\ominus}$ d |
|---|---|---|---|---|---|
| I. | (thiophene structure) | 152–153°C. | 154–155°C. | 202–203°C. | 114–115°C. |
| II. | (p-methoxyphenyl structure) | 158–159 | 185–194 | 210–238 | 115–115.5 |
| III. | (p-phenoxyphenyl structure) | 171–172 | 161–165 | 198–199 | 116 |
| IV. | (phenyl structure) | — | 168–170 | — | — |

\* $R = $ (3,5-dimethyl-4-isoxazolyl)

The compounds of the invention are useful as antimicrobials for the control of various bacteria, fungi and yeasts such as, for example, *S. aureus, E. coli, C. albicans, T. mentagrophytes, B. subtilis, A. terreus, C. pelliculosa, P. pullulans, S. typhosa, M. phlei, P. aeruginosa*, P. Species Strain 10 and Trichoderma Species Madison P-42. This is not to suggest that all of the compounds are equally effective against the same organisms or at the same concentrations. For antimicrobial uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsion or aqueous dispersions. The augmented compositions are adapted to be formulated as concentrates and subsequently diluted with additional liquid or solid adjuvants to produce the ultimate treating compositions. Good results are obtained when employing compositions containing antimicrobial concentrations and usually from about 100 to 10,000 parts by weight of one or more of the compounds per million parts of such composition.

In representative operations, the compounds of the present invention were tested for their activity for the control of bacteria, fungi and yeasts using standard agar dilution tests. The following Table indicates results obtained with the given compounds at concentrations in parts per million for 100% control (kill) of the indicated organisms. In each case, the controls supported a heavy growth of the test organisms.

by reacting the preceding iodo compound, dissolved in a mixture of acetic acid and acetic anhydride, with excess 40% peracetic acid over a period of about 20 minutes while maintaining the exotherm at 25°C., neutralizing the sulfuric acid present in the peracetic acid with a small amount of sodium acetate, evaporating the resulting solution with a dry air stream and recovering the product as white crystals. The 3,5-dimethyl-4-[bis(trifluoroacetoxy)iodo]isoxazole was prepared in the following way. Pertrifluoroacetic acid was prepared according to the procedure of Emmons; W. D. Emmons et al., J.A.C.S. 76, (1954), 3468, 3470, 3472; 77 (1955), 89, 2287. To a stirred, cold (5°C.) mixture of 2.75 ml. (0.10 mole) 90% hydrogen peroxide and 20 ml. methylene chloride there was added, dropwise, 15 ml. (0.1 mole) of trifluoroacetic anhydride. The temperature was kept below 25°C. by external cooling. This cooled, and now homogenous, solution was transferred to a dropping funnel and added dropwise over 30 minutes to a solution of 11.1 g. (50 mmoles) of 4-iodo-3,5-dimethylisoxazole in 50 ml. methylene chloride. During addition, the temperature was kept below 15°C. by means of an ice bath. The mixture was then allowed to warm to room temperature and stirred for 1 hour. The resulting cloudy solution was evaporated under vacuum to a tan oil. This was diluted with about five volumes of ether and the product precipitated. Filtration and drying afforded 13.5 g. (60%) of the product as a white solid, m.p. 133°c. (dec.). The infrared and proton nuclear magnetic resonance spectra were compatible with the proposed structure. In the prepara-

TABLE II

Minimum Growth Inhibitory Concentrations, ppm

| Cmpd.* | Sa | Ec | Ca | Tm | Bs | At | Cp | Pp | St | Mp | Pa | Ps | Ts |
|---|---|---|---|---|---|---|---|---|---|---|---|---|---|
| Ia | 10 | 100 | 500 | 10 | 1 | 100 | 500 | 10 | 10 | 1 | 10 | 10 | 100 |
| Ib | 10 | 100 | | 10 | 10 | 100 | 500 | 100 | 100 | 10 | 100 | 100 | 100 |
| Ic | 100 | 100 | 500 | 100 | 1 | 100 | 500 | 100 | 10 | 10 | 100 | 10 | 100 |
| Id | | | | | 500 | | | | | 500 | 500 | | |
| IIa | 500 | | | | 100 | | | | | 10 | | | 500 |
| IIb | 500 | | | 500 | 100 | 500 | | 500 | | 100 | | | 500 |
| IIc | 500 | | | 500 | 500 | 500 | | 500 | | 100 | | | 500 |
| IId | | | | 500 | 500 | | | | | 500 | | | |
| IIIa | 100 | 500 | | 100 | 10 | | | 100 | 500 | 10 | | | |
| IIIb | 500 | 500 | 500 | 500 | 500 | 500 | 500 | 500 | 500 | 500 | | | |
| IIIc | 500 | 500 | 500 | 500 | 10 | 500 | 500 | 500 | 500 | 10 | | | |
| IIId | 500 | | | 100 | 100 | | | 500 | | 100 | | | |
| IVb | 500 | 500 | | 500 | 100 | 500 | | 500 | 500 | 100 | 100 | 500 | |

Controls: Heavy growth of test organisms

*As identified in Table I
Sa = *S. aureus*
Ec = *E. coli*
Ca = *C. albicans*
Tm = *T. mentagrophytes*
Bs = *B. subtilis*
At = *A. terreus*
Cp = *C. pelliculosa*
Pp = *P. pullulans*
St = *S. typhosa*
Mp = *M. phlei*
Pa = *P. aeruginosa*
Ps = *P.* Species Strain 10
Ts = *Trichoderma* Species Madison P-42

The 3,5-dimethylisoxazole starting material is prepared by the process of G. T. Morgan, J. Chem. Soc., 119 (1921), 697. The 4-iodo-3,5-dimethylisoxazole starting material, from which the corresponding diacetoxyiodo compound is prepared, is described in Doklady Acad. Nauk S.S.S.R. 133, (1960), 598. The 3,5-dimethyl-4-[bis(diacetoxy)iodo]isoxazole is prepared tion of the 3,5-dimethyl-4-]bis(trifluoroacetoxy)iodo]isoxazole, there was obtained about 5% (based on starting iodide) of a milky white solid in the reaction which was very hygroscopic when filtered. Analysis of this material showed 69.6% I, 0.6% N, 0.7% H, and 3.2% C. It is suspected that this material was $I_2O_5$ contaminated with organics. For $I_2O_5$ the analysis should give 75.9% I. Since iodine pentoxide in an intimate mixture with organic materials is known to be detonatable, appropriate caution should be observed.

What is claimed is:

1. A compound represented by the formula

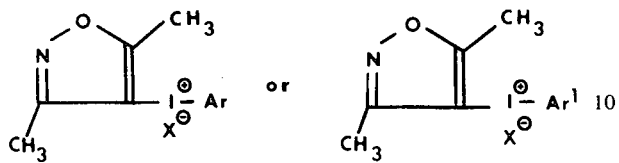

wherein Ar represents thienyl, phenyl or monosubstituted phenyl in which the substituents are selected from lower alkyl, lower alkoxy and phenoxy and wherein Ar' represents mono- halophenyl and X represents an anion selected from trifluoroacetate, trichloroacetate, chloride and bromide.

2. The compound of claim 1 which is the (3,5-dimethyl-4-isoxazolyl)-2-thienyliodonium trifluoroacetate, trichloroacetate, chloride or bromide salt.

3. The compound of claim 1 which is the (3,5-dimethyl-4-isoxazolyl)-4-anisyliodonium trifluoroacetate, trichloroacetate, chloride or bromide salt.

4. The compound of claim 1 which is the (3,5-dimethyl-4-isoxazolyl)-4-phenoxyphenyliodonium trifluoroacetate, trichloroacetate, chloride or bromide salt.

5. The compound of claim 1 which is (3,5-dimethyl-4-isoxazolyl)phenyliodonium bromide.

* * * * *

UNITED STATES PATENT OFFICE
CERTIFICATE OF CORRECTION

PATENT NO. : 3,896,140
DATED : July 22, 1975
INVENTOR(S) : Raymond A. Plepys; Zdravko Jezic It is certified that error appears in the above-identified patent and that said Letters Patent are hereby corrected as shown below:

Column 1, line 10 (in the formula), "$Ar^1$" should read --Ar'--;

Column 1, line 16, after the word "carbon" insert --alkyl and 1 to 4 carbon--;

Column 2, line 42, after the phrase "in place of", insert --the--;

Column 4, line 2, "64" should read --64%--;

Column 4, line 15, after "(9.2" insert --g., 94--;

Column 6, line 29, "133°c." should read --133°C.--;

Column 6, line 62, "]bis" should read --[bis--;

Column 7, line 10 (in the formula), "$Ar^1$" should read --Ar'--.

Signed and Sealed this twenty-fifth Day of November 1975

[SEAL]

Attest:

RUTH C. MASON
*Attesting Officer*

C. MARSHALL DANN
*Commissioner of Patents and Trademarks*